E. M. VAN NOSTRAN.
AERIAL CONDUIT AND CABLE GUARD.
APPLICATION FILED JAN. 10, 1910.
989,212.
Patented Apr. 11, 1911.
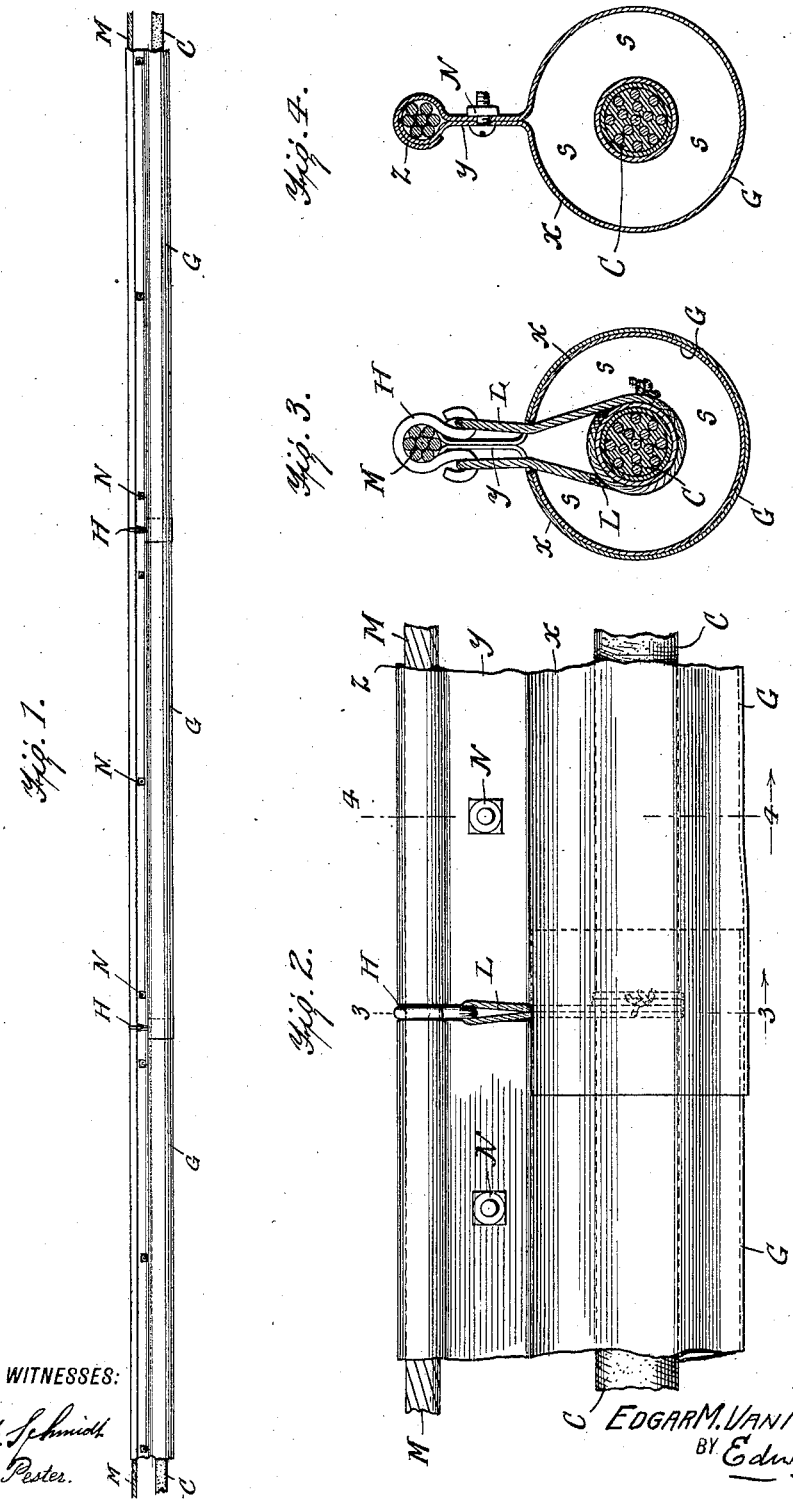
WITNESSES:
INVENTOR
EDGAR M. VAN NOSTRAN,
BY
ATTORNEY

UNITED STATES PATENT OFFICE.

EDGAR M. VAN NOSTRAN, OF WABASH, INDIANA.

AERIAL CONDUIT AND CABLE-GUARD.

989,212.            Specification of Letters Patent.      Patented Apr. 11, 1911.

Application filed January 10, 1910. Serial No. 537,181.

*To all whom it may concern:*

Be it known that I, EDGAR M. VAN NOSTRAN, a citizen of the United States, residing at Wabash, in the county of Wabash and State of Indiana, have invented certain new and useful Improvements in Aerial Conduits and Cable-Guards, of which the following is a specification.

In the aerial extension of telephone and telegraph wires, where a number of them are carried together in the form of an insulating cable, it has been customary to support the weight of such cable on what is known as a messenger wire or supporting cable of higher tensile strength, the electrical cable being connected to the supporting messenger cable by hanger clips placed at intervals along the line and suspending the electrical cable from the messenger cable. This messenger cable is usually made of steel wire of sufficient tensile strength not only to support the electrical cable, but also to sustain a lineman who by means of a sling and a rolling trolley wheel is enabled to ride the wire for inspection and repairs. When such electrical cable passes through the branches of trees or across other wires, or obstruction, at railroad or street crossings, they are liable to become chafed and worn from extraneous contact so as to allow the escape or short circuiting of the electric currents. My invention is designed to prevent this, by a novel form of aerial conduit and cable guard, which, while it does not touch the cable at all, extends along the length of the same as far as desired and completely incloses it and protects it without risk of short circuits, and which may be rapidly put up or taken down in any desired lengths and at the same time excluding rain and snow from the cable and forming a more perfect insulation as well as a mechanical protection against abrasion. My aerial conduit and cable guard is also so constructed that, while it is sustained upon the same messenger wire as the electric cable, it does not in any way interfere with the riding of the wire by the lineman.

In the drawing: Figure 1 is a side view of a horizontal extension of an electric cable and messenger wire, with my aerial conduit and cable guard applied to the same. Fig. 2 is an enlarged side view of the same at one of the joints between the sections. Fig. 3 is a transverse section taken on the line 3—3 of Fig. 2 looking in the direction of the arrow, and Fig. 4 is a transverse section on line 4—4 of Fig. 2.

In the drawing M is the messenger wire, here shown as a steel cable, and C is the electrical cable, consisting of any number of embedded and insulated circuit wires. This heavy cable is suspended at intervals along its length by hangers in the form of metal stirrups or clips H and stout loops L of non-conducting cord, which is wrapped around the cable and is attached to the stirrup-shaped ends of the hangers H whose upper middle portion straddles the messenger wire.

G represents my aerial conduit and cable guard. This, as shown, is made of sheet metal, but it may be made of any other desired material. It is constructed in sections of uniform length of two or three feet whose ends are telescoped over each other like stove pipe sections to give continuity to the guard and permit of indefinite extension at the pleasure of the workman. This telescopic connection also makes the conduit stiff and integral and also closes it tightly at the joints against the entry of snow or rain. The sections are all made alike and are each bent from a single piece of metal to form a main protecting tube $x$ and a smaller supporting tube $z$ and an intermediate flat and parallel neck portion $y$. The main protecting tube $x$, which forms the guard for the cable and incloses the same, is two or more inches in diameter, according to the size of the cable C, and is sufficiently larger than the cable to leave a considerable air space $s$ all around between the cable and the guard which gives an insulating body of dry air and also removes the guard surface far enough away from the cable to prevent any chafing object from cutting through the guard and touching the cable. The supporting tube $z$ is made to fit snugly to the messenger cable and will be usually about $\frac{3}{8}$ of an inch in diameter, according to the size of the messenger cable. The flat neck portion between the two tubes is about $\frac{3}{4}$ of an inch vertically and the two sides $y$ $y$ of the same are clamped together at intervals by bolts and nuts N.

In forming the sections G the larger tubular guard portion $x$ is preferably made longer than the neck portion $y$ and suspending tube $z$, so as to allow the larger tubular portions to telescope over each other at the joints, as best seen in Fig. 2, while the portions $y$ and $z$ do not telescope. This, while stiffly connecting the tube sections as a unit, allows the hanger H to drop down between the adjacent ends of the parts $y$ and $z$ of the sections so that the thickness of the metal of the hanger will project only a very little distance above the level of the upper tube and will not, therefore, oppose any serious obstacle to the trolley wheel of the lineman's sling in riding the messenger wire. Furthermore, this allows the loop L of the hanger H to descend directly to the interior of the guard tube $u$ to connect with the cable C, which it does at a point inside the telescoping ends of the guard.

The messenger wire is to be sustained on poles in the usual way, or it may, when my aerial conduit and guard is applied, be carried on trees without danger of destroying the insulation and short circuiting the wires.

I am aware that it is not new to suspend the cable from the messenger wire by hangers of the form shown, and I neither claim such construction, nor do I limit my invention to it, as other forms of hangers may be used. I am also aware that an electric cable has been provided with an external armor sheath secured in direct contact with the cable and I make no claim to this. I desire, however, to particularly point out, as important features of my invention, the fact that, when the cable is slung from the messenger wire and my offsetting tubular guard made of the proportions shown is applied as described, the guard is held concentric with the cable, but offsetting therefrom with a non-conducting air space $s$ all around and it exercises also a mechanically protective influence as against all chafing and mechanical injury which would result in short circuits or loss of current. Furthermore, the telescopic connection of the sections gives unity and integral strength and prevents any individual swaying movement in any section, and permits also easy and practical extension of the guard through any length of line.

In making use of my invention I would have it understood that various changes in details may be made without departing from my invention as set forth in the claims.

I claim:

1. An aerial conduit and cable guard, comprising a relatively large tubular portion for inclosing the cable, a relatively small tubular portion for inclosing the messenger wire, and flat and intermediate neck portions made integral with the tubular portions, and bolts for clamping said neck portions together.

2. An aerial conduit and cable guard, consisting of a relatively large tubular portion for inclosing the cable, a relatively small tubular portion for inclosing the messenger wire, the larger tubular portion being of greater length than the small tubular portion to allow the telescoping of the larger tubular portions.

3. An aerial conduit and cable guard, consisting of a relatively large tubular portion for inclosing the cable, a relatively small tubular portion for inclosing the messenger wire, the larger tubular portion being of greater length than the small tubular portion to allow the telescoping of the larger tubular portions, in combination with an electric cable of smaller size than the large tubular portions, a messenger wire arranged in the small tubular portion, and hangers suspended upon the messenger wire and supporting the cable in the center of the large tubular portion and out of contact with the same.

4. The combination with a messenger wire, an electric cable, and hangers for supporting the cable on the messenger wire, of a continuous inclosing tubular guard offsetting from contact with the cable with an air space between.

5. The combination with a messenger wire, an electric cable, and hangers for supporting the cable on the messenger wire, of a continuous inclosing tubular guard offsetting from contact with the cable with an air space between, said tubular guard being made in sections connected by telescopic joints.

6. The combination with a messenger wire, an electric cable, and hangers for supporting the cable on the messenger wire, of a continuous inclosing tubular guard offsetting from contact with the cable with an air space between, said tubular guard having the portion which incloses the cable of greater length than the portion that incloses the messenger wire and telescoping together, and the hanger supported on the messenger wire being connected with and supporting the cable at a point inside the outer ends of the tubular guard sections.

In testimony whereof I affix my signature in presence of two witnesses.

EDGAR M. VAN NOSTRAN.

Witnesses:
CHAS. S. ROSE,
JNO. B. LATCHEM.

---

Copies of this patent may be obtained for five cents each, by addressing the "Commissioner of Patents, Washington, D. C."